UNITED STATES PATENT OFFICE.

RAYMOND C. BENNER AND HARRY F. FRENCH, OF FREMONT, OHIO, ASSIGNORS, BY MESNE ASSIGNMENTS, TO NATIONAL CARBON COMPANY, INC., A CORPORATION OF NEW YORK.

ELECTRIC BATTERY.

1,289,366.           Specification of Letters Patent.      Patented Dec. 31, 1918.

No Drawing.      Application filed July 31, 1916.    Serial No. 112,257.

*To all whom it may concern:*

Be it known that we, RAYMOND C. BENNER and HARRY F. FRENCH, citizens of the United States, residing at Fremont, in the county of Sandusky and State of Ohio, have invented a certain new and useful Improvement in Electric Batteries, of which the following is a full, clear, and exact description.

This invention relates to electric batteries. While the improvement is not limited to any particular type, it is of especial value in connection with copper oxid batteries having an alkaline electrolyte, such as the Lalande type and its modifications. In this type of battery the positive electrode usually consists of zinc and the negative of powdered copper oxid which may be inclosed in a perforated container.

In some modifications of this type of cell the negative electrode consists of a block of molded copper oxid, but the electrochemical action is the same in each case. The complete battery consists of a jar containing alkaline electrolyte such as sodium or potassium hydroxid with an appropriate cover from which the two electrodes are suspended.

We have found that the voltage of the previously mentioned cell is materially raised by adding, preferably to the copper oxid mass, elemental tellurium or solenium. There does not seem to be any specific proportion of this material that need be used, as it has the voltage raising effect with small amounts as well as with large amounts.

The characteristic is not limited to elemental tellurium and selenium, but is possessed by the soluble tellurids and selenids, as well as by the greater part of the insoluble compounds of selenium and tellurium. There are various ways that the selenium and tellurium material can be added to the cell, one way being to mix the powdered elemental material with the copper oxid. The tellurium and selenium may also be dissolved in solvents and the copper oxid element soaked therein.

The copper oxid may be mixed with tellurium or selenium and heated moderately until the tellurium or selenium melt and bind the copper oxid particles together. In this way the copper oxid mass will be held securely together and cannot sift out of the perforated container. This process may also be used to make a solid block of depolarizer without using a perforated container.

In case of the selenids and tellurids or other compounds, these may be ground and mixed with the copper oxid or they may be dissolved and the copper oxid mass soaked therein.

The general principles of this invention have been set forth and a number of examples mentioned, but there are various modifications that could be used and the latter are not to be assumed as being without the purvey of the claims.

Having described our invention, what we claim is:—

1. In electric batteries, a negative element containing a mixture of copper oxid and selenium.

2. In electric batteries, an alkaline electrolyte, a negative element containing a mixture of copper oxid and selenium.

3. In electric batteries, the combination of an alkaline electrolyte with a zinc electrode and a negative element containing a mixture of copper oxid and selenium.

In testimony whereof, we hereunto affix our signatures.

RAYMOND C. BENNER.
HARRY F. FRENCH.

Copies of this patent may be obtained for five cents each, by addressing the "Commissioner of Patents, Washington, D. C."